United States Patent Office 2,846,470
Patented Aug. 5, 1958

2,846,470

PROCESS FOR PRODUCING GLUTAMINE

Rose Marie Joyce, Northbrook, Ill., assignor to International Minerals & Chemical Corporation, a corporation of New York No Drawing. Application May 17, 1957
Serial No. 659,774

15 Claims. (Cl. 260—534)

This invention relates to the preparation of glutamic acid derivatives, and more particularly to a process for preparing glutamine.

L-glutamine occurs in abundance in nature, but its recovery from natural sources is difficult and expensive. Accordingly, the art has turned to various processes for synthesizing glutamine, but a simple, inexpensive method has not yet been devised. In one prior-art method, described by Akabori et al. in Japanese Patent 28–1582 (published April 15, 1953), L-gamma-glutamylhydrazide is treated with Raney nickel in 50% aqueous ethanol. The yield of L-glutamine, however, is quite low in the reported process.

It is an object of the instant invention to provide an improved synthesis of glutamine in which comparatively high yields are obtained using cheap, readily available reactants.

It is a further object of the instant invention to provide an improved method for the synthesis of glutamine having the same optical activity as the glutamine found in nature, that is, L-glutamine.

It is a further object of the instant invention to provide a method for synthesizing L-glutamine in comparatively high yields without resorting to the production and resolution of a racemic mixture.

These and other objects of the instant invention will become more apparent upon a fuller understanding of the invention as hereinafter described.

The present invention is an improvement upon the process of Akabori et al., referred to above. In accordance with the invention, the reaction of gamma-glutamylhydrazide with Raney nickel is carried out at elevated temperature and at a pH above about 9 in a solvent medium which preferably consists of water alone, but which in any event comprises at least about 65% water by volume. The yield of glutamine is greatly improved thereby.

By the term "glutamine" as used hereinafter is meant the optically active natural form of glutamine, that is, L-glutamine, or its enantiomorph D-glutamine, or the racemic modification DL-glutamine. L-glutamine is the most important form of glutamine at the present time, and the invention will be described and illustrated as applied to L-glutamine. It will be understood, however, that D-glutamine or DL-glutamine may be produced instead of L-glutamine in any of the embodiments of this invention. For example, D-glutamine can be prepared in accordance with this invention from D-gamma-glutamylhydrazide, and DL-glutamine can be prepared in accordance with this invention from DL-gamma-glutamylhydrazide.

More particularly, this invention is carried out by dissolving gamma-glutamylhydrazide in an aqueous medium comprising at least 65% water by volume and adding a Raney nickel catalyst to the solution, preferably a Raney nickel W–4 catalyst. The aqueous medium utilized may be water alone or a mixture of water and a water-soluble polar organic solvent which is inert under the reaction conditions obtained during the process. It is preferred that water alone be used as the solvent, but if somewhat diminished yields of glutamine can be tolerated, the water can be diluted with a water soluble organic solvent which remains inert during the reaction. When a mixture of water and an organic solvent is employed as the aqueous solvent medium, the water content of the mixture must amount to at least about 65% by volume. As the concentration of water in the solvent is decreased below the 65% level, the yield of glutamine produced by the process decreases quite rapidly until at a 50:50 water-organic solvent mixture, the yield of glutamine amounts to 60% or less of the yield obtained at the 65% water concentration level.

The aqueous solvent medium is utilized in an amount which is the minimum which will permit complete dissolution of the hydrazide at the reaction temperature to be employed. When water alone is employed as the solvent medium, it is convenient to utilize about 12 parts of water per part of hydrazide. Dissolution of the hydrazide in the water or water-organic solvent mixture may be facilitated if necessary by warming. Quantities of water or water-organic solvent mixture in excess of the minimum necessary to dissolve the hydrazide may be used if desired, but there is some disadvantage in doing so, since the water and solvent must eventually be removed, and any excess of these materials merely increases the cost of the process.

Organic solvents which may be mixed with water to form the aqueous solvent medium for carrying out the invention include liquids such as the lower alcohols, that is, alcohols containing less than about 8 carbons, for example, methanol, ethanol, isopropanol, butanol, secondary butanol, tertiary butanol, pentanol, etc. Additional solvents which may be utilized include dimethylformamide, dioxane, tetrahydrofurfuryl alcohol, and the like.

The Raney nickel catalyst utilized in the process of this invention is preferably a Raney nickel W–4, W–6, or W–7 catalyst. These catalysts and other Ranel nickel catalysts are well known to the art. The Raney nickel W–4 catalyst is described in J. Am. Chem. Soc., 68, page 1471 (1946). This reference discusses the method of preparing a Raney nickel catalyst which is more active than that prepared by the original method described in the Raney patent, U. S. Patent No. 1,628,190. In the preparation of Raney nickel W–4, a Raney nickel-aluminum alloy is reacted with an alkaline solution for a shorter period of time and at a lower temperature than in the original method for preparing Raney nickel, and the catalyst is washed by an improved method, out of contact with air. The time elapsing from the beginning of the preparation until the completion of the digestion period is reduced from about 12 hours to less than 1½ hours, the temperature never being allowed to go above 50° C. at any stage of the process. Raney nickel W–5, W–6, and W–7 catalysts are described in J. Am. Chem. Soc., 70, page 695 (1948). The Raney nickel W–4 catalyst is particularly preferred in carrying out the instant invention for the reason that the greatest yields of glutamine are obtained therewith.

The Raney nickel catalyst is added to the solution or suspension of gamma-glutamylhydrazide in an amount between about one part and about 4 parts by weight of catalyst per part of hydrazide in solution. While less than one part of catalyst per part of hydrazide can be utilized, the yield of glutamine will be impaired thereby. The use of more than about 4 parts of catalyst per part of hydrazide does not produce any substantial increase in the yield of glutamine, and is wasteful of catalyst. Preferably, about 2 parts of catalyst per part of hydrazide are utilized in order to obtain optimum yields of the desired product.

In order to realize the highest yields of glutamine in accordance with the process of this invention, the reaction must be carried out under alkaline conditions, suitably at a pH above about 9. The alkalinity may arise as a result of the use of a wet Raney nickel W-4 catalyst which has been stored under water, the water and the catalyst retaining alkalinity from the catalyst preparation. The addition of such a wet catalyst with the adhering alkaline liquid to a solution of the gamma-glutamylhydrazide ordinarily adjusts the pH of the solution to the desired alkaline level and produces conditions suitable for carrying out the instant process. In the case of a non-alkaline Raney nickel catalyst, the addition of such a catalyst to a solution of gamma-glutamylhydrazide will not impart alkalinity to the solution and it is desirable under these circumstances to adjust the solution to a pH greater than about 9 by addition of an alkali, such as an alkali-metal hydroxide, for example, sodium hydroxide or potassium hydroxide, but preferably by addition of ammonia to the solution. Reduced yields of glutamine are obtained if the pH of the reaction mixture at the completion of the reaction is less than about 9. Preferably, the pH of the reaction product mixture should be greater than about 9.5 if the best yields are to be obtained.

Following addition of the Raney nickel catalyst to the solution or suspension of gamma-glutamylhydrazide, the mixture is heated to between about 50° C. and about the reflux temperature of the solution until the reaction of the hydrazide to form glutamine is substantially complete. Temperatures below about 50° C. may be utilized, but the rate of reaction is seriously impaired thereby. Preferably, the reaction mixture is heated at a temperature between about 65 and about 75° C. Usually the reaction is complete in about 1 to about 3 hours, but under some conditions longer times may be required. Utilizing water alone as the solvent medium, the optimum reaction time is about 2 hours.

Following the completion of the reaction, the catalyst is removed by any convenient method, for example, by filtration, and the filtrate containing glutamine can be treated to recover the glutamine therefrom. Thus, the glutamine solution may be evaporated and cooled to recover the glutamine by crystallization from the solution.

Usually the filtrate remaining following removal of the nickel catalyst from the reaction product mixture will contain a small amount of nickel which, if not removed, will contaminate the glutamine ultimately crystallized from the solution. The nickel in the filtrate can be removed by acidifying with formic acid to about pH 5, adding sufficient dimethylglyoxime to react with all of the nickel present, adding aqueous ammonia to about 7.2, and filtering or otherwise removing the nickel-dimethylglyoxime complex. The remaining solution containing glutamine can then be evaporated and glutamine crystallized therefrom. By following this procedure, glutamine having a purity of the order of between about 98% to about 99% can be obtained in yields of the order of about 80% of the theoretical based upon the weight of gamma-glutamylhydrazide employed.

According to another method, the nickel remaining in the filtrate following removal of the nickel catalyst from the reaction product mixture can be removed by treating the filtrate with hydrogen sulfide under alkaline conditions, preferably with ammonium sulfide. In accordance with a preferred procedure, the filtrate having a pH of about 9.5 is treated with ammonium sulfide in sufficient amount to react with all of the nickel present. The addition of the ammonium sulfide results in the formation of nickel sulfide, which is colloidal in nature and remains in suspension. The nickel sulfide colloid is coagulated by adding acetic acid to the reaction mixture in sufficient amount to adjust the pH to between about 4 and about 5, and then heating the mixture at about 40° C. for a few minutes. The coagulated nickel sulfide can then be separated from the solution by any convenient means, for example by filtration. When filtration is used to remove the nickel sulfide, it is convenient to add a filter aid to the mixture in order to improve the filtration rate. Following removal of the nickel sulfide, the glutamine solution remaining can be treated by conventional procedures to recover the glutamine therefrom. For example, the solution can be evaporated, preferably in vacuo, and then cooled to crystalize the glutamine.

In accordance with one embodiment of this invention, L-glutamic acid is utilized as a starting material. The L-glutamic acid is esterified with phenol or an alcohol, preferably a lower aliphatic alcohol, that is, an alcohol having fewer than 8 carbon atoms, such as, for example, methyl alcohol or ethyl alcohol, to produce the gamma-ester of L-glutamic acid. Esterification is preferably carried out at temperatures below about room temperature in the presence of sulfuric acid as a catalyst.

The gamma-ester of L-glutamic acid has the structural formula:

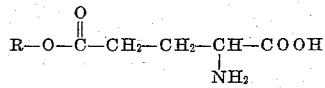

when R is a lower alkyl or a phenyl group. Gamma-alkyl esters of L-glutamic acid are preferred, and particularly gamma-alkyl esters of L-glutamic acid in which the alkyl group is a lower alkyl group, that is, an alkyl group containing fewer than 8 carbon atoms. Among the suitable esters are gamma-methyl, gamma-ethyl, gamma-propyl, gamma-isopropyl, and gamma-butyl L-glutamate and the like. The gamma-methyl ester of L-glutamic acid is particularly preferred because yields of L-glutamine obtained are higher than when other gamma-esters of L-glutamic acid are employed and less time is required in carrying out of the process.

The gamma-ester of L-glutamic acid is treated with hydrazine in the form of an aqueous solution or an aqueous alcohol solution to yield the gamma-hydrazide of L-glutamic acid, otherwise referred to as L-gamma-glutamylhydrazide, and having the following structural formula:

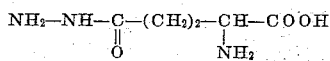

Hydrazine or hydrazine hydrate in the mount of at least about one mole, and preferably between about 2 moles and about 7 moles of hydrazine per mole of the gamma-ester of L-glutamic acid, is utilized. The reaction is preferably carried out at a temperature between about room temperature and about 65° C., preferably at the autogenous temperature, until the hydrazide-forming reaction is substantially complete. Usually the reaction requires a few minutes only. Following completion of the reaction, the L-gamma-glutamylhydrazide may be separated from the reaction product mixture by any convenient means, for example by filtration, and purified by washing with a solvent, such as methanol. The product is then dried, for example, at about 80° C.

L-gamma-glutamylhydrazide is converted to L-glutamine by dissolving in an aqueous solvent medium, preferably water, but permissibly water in admixture with an organic solvent inert under the reaction conditions obtaining. A Raney nickel W-4 catalyst is added to the solution and the mixture is heated at a temperature between about 50° C. and the reflux temperature until the glutamine-forming reaction is substantially complete. The L-glutamine may be recovered from the reaction product mixture by treatment to remove residual nickel, then evaporating the solvent medium and cooling the residual solution to crystallize L-glutamine therefrom. L-glutamine prepared by this process has a purity of the order of about 95% or higher, and may be recovered in yields of the order of about 80% of the theoretical based upon the weight of the L-gamma-glutamylhydrazide utilized.

The term "aqueous solvent medium" as used herein includes water alone and water in admixture with an organic solvent which is inert under the reaction conditions obtaining during the glutamine-forming reaction.

The following operating examples will more clearly illustrate my invention.

*Example I*

The following test illustrates the use of water as the reaction medium in my invention.

*Gamma-methyl L-glutamate preparation.*—L-glutamic acid (147 grams) was suspended in 2.4 liters of absolute methanol. The mixture was cooled in an ice bath, and 72.6 ml. of concentrated sulfuric acid (95%) were added with stirring at such a rate as to keep the temperature between 10 and 15° C. The stirring was thereafter continued at room temperature for 3 hours to permit the esterification to reach substantial completion. The product mixture was again cooled, adjusted to a pH between 7.5 and 8 with 530 ml. of a 1:1 solution of diethylamine and methanol, stored at about 0° C. for 16 hours, and filtered. The solids were washed well with methanol and dried at 75° C. The product, gamma-methyl L-glutamate, melted at 170° C. and weighed 139 g., corresponding to a yield of 86.3% of theory.

*L-gamma-glutamylhydrazide preparation.*—Solid gamma-methyl L-glutamate (80.5 g.) was added with vigorous agitation to 117 ml. of an aqueous 85% aqueous hydrazine hydrate solution while cooling to maintain the temperature below 20° C. Precipitation began 5 minutes after the addition had been completed, and the temperature rose to 34° C. despite cooling in an ice bath. Stirring was continued for 15 minutes, after which 200 ml. of methanol were added, and the product mixture was stored in a refrigerator at 0 to 10° C. for 2 hours. The mixture was then filtered. The solids were washed with 225 ml. of methanol and dried at 65° C. overnight. The product, L-gamma-glutamylhydrazide, melted at 161° C. and weighed 73.6 g., corresponding to a yield of 78.3% of theoretical.

*L-glutamine preparation.*—L-gamma - glutamylhydrazide (20 g.) was dissolved in water (240 ml.) with gentle warming, and an alkaline Raney nickel W-4 catalyst (40 g.) was added to the solution. The alkaline mixture was agitated while being heated to about 68° C., and agitation was continued at this temperature for about 2 hours. The reaction product mixture, which had a pH of about 9.7, was then filtered to remove the catalyst, and the catalyst was washed with 20 ml. of water, the wash water being added to the filtrate. To the filtrate was added 40 ml. of an aqueous 24% ammonium sulfide solution with agitation, and the resulting mixture was acidified to pH 4.2 with 53 ml. of acetic acid to coagulate the nickel sulfide which formed. A diatomaceous earth filter aid (5 g.) was added, and the mixture was heated at 50° C. for 10 minutes, then filtered. The solids comprised essentially nickel sulfide. The clear filtrate was evaporated under vacuum at a maximum temperature of about 60° C. to a volume of 125 ml., at which point L-glutamine began to crystallize from the solution. The evaporation was then stopped; and while the solution was still warm, 2 volumes of methanol were added. The solution was then cooled to around 0 to 10° C. and maintained within this range until the L-glutamine had substantially completely crystallized. The L-glutamine was separated by filtration, washed with methanol, and dried at 75° C. for 3 hours. The product weighed 12.7 grams and had a purity of 98.8%, corresponding to a yield of 80% of the theoretical, based upon the L-gamma-glutamylhydrazide utilized.

*Example II*

The following test illustrates the preparation of L-glutamine according to my invention, utilizing a low proportion of water as the reaction medium to eliminate the step of concentrating the product, and omitting the step of separately filtering off the metallic nickel catalyst.

L-gamma-glutamylhydrazide (10 g.), Raney nickel W-4 catalyst (20 g.), and water (30 ml.) were mixed at room temperature and heated at an average temperature of 70° C. (maximum, 93° C.) for approximately 1.6 hours. The mixture was then cooled and to it were added 20 ml. of aqueous 24% ammonium sulfide solution, then 40 ml. of glacial acetic acid. The catalyst (nickel and precipitated nickel sulfide) was filtered off. The filtrate was diluted with 3 volumes of methanol, refrigerated at 0 to 10° C. overnight to permit the L-glutamine to crystallize, and filtered. The product, after being dried, weighed 6.5714 g. and was found to be 98.5% pure, corresponding to a yield of 83.7% of theoretical.

*Example III*

The following test illustrates the improved results obtained by using an aqueous 35 vol.-percent ethanol solution as a solvent in the preparation of L-glutamine in accordance with the present invention.

*Reaction.*—Five grams of L-gamma-glutamylhydrazide were dissolved in 60 milliliters of an aqueous 35% ethanol solution at 40° C., and 10 g. of Raney nickel W-4 catalyst were added. The mixture was stirred and refluxed at between 65 and 75° C. for two hours.

*Nickel removal.*—The reaction product was cooled and filtered to remove the solid nickel phase. The filter cake was washed with a small amount of warm water, and the washings and filtrate were combined. The combined filtrate and washings (blue in color from dissolved nickel compounds, and having a pH of 9.7) were then mixed with 10 ml. of an aqueous 24% ammonium sulfide solution to precipitate the nickel as nickel sulfide, and the pH of the mixture was adjusted to 4.5 with acetic acid to coagulate the precipitate. The precipitate was removed from the mixture by filtration.

*Glutamine recovery.*—The filtrate was evaporated in vacuo at about 40° C. to incipient crystallization (about 30 milliliters). Absolute methanol was added in a volume of 60 milliliters and the solution was cooled to about 0° C. for a period of 12 hours, during which time L-glutamine crystallized therefrom. The L-glutamine was separated by filtration, dried, weighed (2.8680 g.), and analyzed (93.53% pure). The yield was 69.3% of theoretical.

*Example IV*

The following test further illustrates the improved results obtained in the present invention using an aqueous 25 vol.-percent methanol solution as the solvent in the treatment of the L-gamma-glutamylhydrazide.

*Reaction.*—Five grams of L-gamma-glutamylhydrazide were dissolved in 60 milliliters of an aqueous 25% methanol solution at 50° C. and 10 g. of Raney nickel W-4 catalyst were added. The mixture was stirred and refluxed at about 65° C. for one hour.

*Nickel removal.*—The reaction product was cooled and filtered to remove the solid nickel phase. The filter cake was rinsed lightly with warm water. The combined filtrate and wash liquor (blue in color from dissolved nickel compounds, and having a pH of 9.1) were then mixed with 10 ml. of an aqueous 24% ammonium sulfide solution to precipitate the nickel as nickel sulfide, and the pH of the mixture was adjusted to 4.5 with acetic acid to coagulate the precipitate. The precipitate was removed from the mixture by filtration.

*Glutamine recovery.*—The filtrate was diluted with three volumes of absolute methanol and refrigerated at about 0° C. over the week-end, during which time L-glutamine recrystallized therefrom. The L-glutamine was filtered off, dried, weighed (2.8014 g.), and analyzed (93.2% pure). The yield was 67.6% of theoretical.

*Example V*

The following test illustrates the use of aqueous 25 vol.-percent dimethylformamide as the reaction solvent in my invention.

L-gamma-glutamylhydrazide (5 g.) was dissolved in 45 ml. of water with gentle warming, and to the solution were added 15 ml. of dimethylformamide and 10 g. of Raney nickel W–4 catalyst. The mixture was stirred and heated at 65–75° C. for 1 hour, and stirring was continued at 30° C. for 0.5 hour longer. The reaction product was filtered. To the filtrate (brilliant blue in color from dissolved nickel compounds, and having a pH of 9.4) were added 10 ml. of aqueous 24% ammonium sulfide solution, and the pH was adjusted to 4.5 with glacial acetic acid. The mixture was warmed to 50° C. for 10 minutes to coagulate the precipitated nickel sulfide, which was filtered off. The clear filtrate was evaporated under vacuum to about 30 ml., then diluted with 3 volumes of methanol, and refrigerated over the week-end to allow the L-glutamine to crystallize. The resulting slurry was filtered, and the L-glutamine was washed with methanol and dried. The product was 99% pure L-glutamine weighing 3.0120 g., which corresponds to a yield of 77.8% of theoretical.

*Example VI*

Aqueous 25 vol.-percent isopropyl alcohol was used as the solvent in the treatment of L-gamma-glutamylhydrazide with Raney nickel at a pH of 9.7, the reaction conditions being otherwise closely parallel to those of Example V. The product L-glutamine was obtained in a purity of 97% and a yield of 72.2% of theoretical.

*Example VII*

Aqueous 25% tertiary-butyl alcohol, when similarly tested at pH 9.7, gave a 71% yield of L-glutamine of 99.1% purity.

*Example VIII*

Aqueous 25 vol.-percent dioxane was used as the solvent in the treatment of L-gamma-glutamylhydrazide with a 4:1 weight ratio of Raney nickel at a pH of 9.4, the reaction conditions being otherwise closely parallel to those of Example V. The product L-glutamine was obtained in a purity of 97.81% and a yield of 78.5% of theoretical.

The foregoing examples are presented only as illustrations of the invention, and without any intent to limit the scope thereof. Numerous modifications and equivalents of the invention will be apparent from the present description to those skilled in the art.

This application is a continuation-in-part of my application Serial No. 509,690, filed May 19, 1955, now abandoned.

In accordance with the foregoing description, I claim as my invention:

1. A process for producing glutamine which comprises heating a solution of gamma-glutamylhydrazide in an aqueous solvent medium containing at least about 65% water by volume at a pH above about 9 and at a superatmospheric temperature in the range up to the reflux temperature in the presence of a Raney nickel catalyst, and recovering glutamine from the reaction product mixture.

2. The process of claim 1 in which the aqueous medium is water.

3. The process of claim 1 in which the catalyst is a Raney nickel W–4 catalyst.

4. The process of claim 1 in which the catalyst is used in an amount between about one part and about 4 parts by weight per part of gamma-glutamylhydrazide.

5. The process of claim 1 in which the reaction is carried out at a temperature between about 50° C. and the reflux temperature for a period between about one hour and about 3 hours.

6. The process of claim 5 in which the reaction is carried out at a temperature between about 65 and about 75° C. for a period of between about 1½ and about 2½ hours.

7. The process of claim 1 in which the aqueous solvent medium contains a water-soluble polar organic solvent which is inert under the reaction conditions obtained during the process.

8. The process of claim 7 in which the organic solvent is a lower alcohol.

9. The process of claim 8 in which the alcohol is methanol.

10. The process of claim 8 in which the alcohol is ethanol.

11. The process of claim 7 in which the organic solvent is dimethylformamide.

12. The process of claim 7 in which the organic solvent is dioxane.

13. A process for producing L-glutamine which comprises heating a solution of L-gamma-glutamylhydrazide in an aqueous solvent medium containing at least about 65% water by volume at a pH above about 9 and at a temperature between about 50° C. and the reflux temperature in the presence of a Raney nickel catalyst, and recovering L-glutamine from the reaction product mixture.

14. A process for producing D-glutamine which comprises heating a solution of D-gamma-glutamylhydrazide in an aqueous solvent medium containing at least about 65% water by volume at a pH above about 9 and at a temperature between about 50° C. and the reflux temperature in the presence of a Raney nickel catalyst, and recovering D-glutamine from the reaction product mixture.

15. A process for producing DL-glutamine which comprises heating a solution of DL-gamma-glutamylhydrazide in an aqueous solvent medium containing at least about 65% water by volume at a pH above about 9 and at a temperature between about 50° C. and the reflux temperature in the presence of a Raney nickel catalyst, and recovering DL-glutamine from the reaction product mixture.

References Cited in the file of this patent

FOREIGN PATENTS

28–1582    Japan _____ Apr. 15, 1953

OTHER REFERENCES

Akabori et al.: Chem. Ab., vol. 48 (1954), p. 12796.